(12) United States Patent
Cabrele

(10) Patent No.: US 7,517,182 B2
(45) Date of Patent: Apr. 14, 2009

(54) SCREW ANCHOR

(75) Inventor: Federico Cabrele, Piazzola sul Brenta (IT)

(73) Assignee: ITW Construction Products Italy S.R.I, Padova (IT)

( * ) Notice: Subject to any disclaimer, the term of this patent is extended or adjusted under 35 U.S.C. 154(b) by 38 days.

(21) Appl. No.: 10/821,860

(22) Filed: Apr. 12, 2004

(65) Prior Publication Data
US 2004/0202522 A1  Oct. 14, 2004

(30) Foreign Application Priority Data
Apr. 11, 2003 (IT) ............ TO2003A0279

(51) Int. Cl.
F16B 13/12 (2006.01)
(52) U.S. Cl. .................................... 411/80.5
(58) Field of Classification Search .............. 411/80.1, 411/80.2, 80.5, 36, 41, 48
See application file for complete search history.

(56) References Cited

U.S. PATENT DOCUMENTS

| | | | | |
|---|---|---|---|---|
| 1,234,487 A * | 7/1917 | Raeger | ............... | 411/80.1 |
| 1,751,818 A * | 3/1930 | Karitzky | ............... | 411/80.5 |
| 2,018,251 A * | 10/1935 | Croessant | ............... | 411/37 |
| 2,918,841 A * | 12/1959 | Poupitch | ............... | 411/36 |
| 3,316,796 A * | 5/1967 | Young | ............... | 411/29 |
| 3,516,324 A * | 6/1970 | Berner | ............... | 411/72 |
| 3,522,756 A * | 8/1970 | von Solff et al. | ............... | 411/80.5 |
| 3,613,497 A * | 10/1971 | Heldermann | ............... | 411/80.2 |
| 3,802,059 A * | 4/1974 | Fischer | ............... | 29/432 |
| 3,832,931 A * | 9/1974 | Talan | ............... | 411/80.2 |
| 3,921,496 A * | 11/1975 | Helderman | ............... | 411/17 |
| 3,942,407 A * | 3/1976 | Mortensen | ............... | 411/36 |
| 4,269,106 A * | 5/1981 | Leibhard et al. | ............... | 411/34 |
| 4,840,523 A * | 6/1989 | Oshida | ............... | 411/48 |
| 4,871,289 A * | 10/1989 | Choiniere | ............... | 411/48 |
| 4,952,106 A * | 8/1990 | Kubogochi et al. | ............... | 411/48 |
| 5,205,688 A | 4/1993 | Sundstrom | | |
| 5,246,323 A | 9/1993 | Vernet et al. | | |
| 5,380,135 A * | 1/1995 | Anquetin | ............... | 411/38 |
| 5,476,350 A * | 12/1995 | Kurtz et al. | ............... | 411/80.2 |
| 5,603,593 A * | 2/1997 | Fischer et al. | ............... | 411/55 |
| 5,690,454 A * | 11/1997 | Smith | ............... | 411/30 |
| 5,702,215 A * | 12/1997 | Li | ............... | 411/21 |
| 5,725,341 A * | 3/1998 | Hofmeister | ............... | 411/32 |
| 6,158,934 A * | 12/2000 | Wieland | ............... | 411/80.1 |
| 6,164,884 A * | 12/2000 | Mayr | ............... | 411/36 |
| 6,679,662 B2 * | 1/2004 | Nehl | ............... | 411/80.5 |
| 6,896,460 B2 * | 5/2005 | Enomoto et al. | ............... | 411/41 |
| 2002/0076297 A1* | 6/2002 | Nehl | ............... | 411/39 |
| 2003/0012618 A1* | 1/2003 | Benito-Navazo | ............... | 411/80.1 |

FOREIGN PATENT DOCUMENTS

EP   000110215 A1 *  6/1984
EP   1248000         10/2002

* cited by examiner

Primary Examiner—Flemming Saether
(74) Attorney, Agent, or Firm—Lowe, Hauptman, Ham & Berner, LLP

(57) ABSTRACT

A screw anchor having a deformable central portion in which are formed four main longitudinal slots defining in pairs on the central portion respective deformable main longitudinal tongues; the screw anchor also having a number of secondary longitudinal slots; and each secondary longitudinal slot defines, on the central portion and with an adjacent main longitudinal slot and/or an adjacent secondary longitudinal slot, respective deformable secondary longitudinal anchoring tongues.

11 Claims, 2 Drawing Sheets

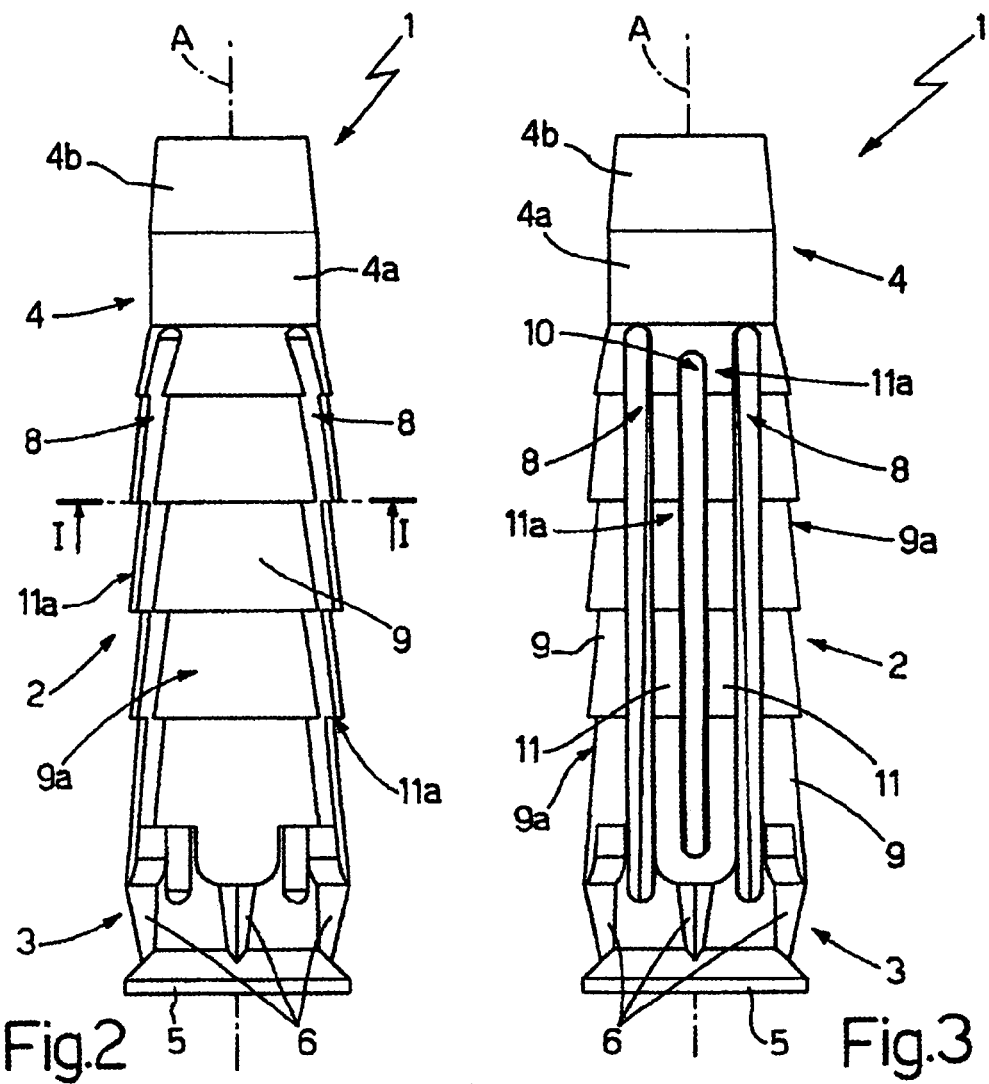
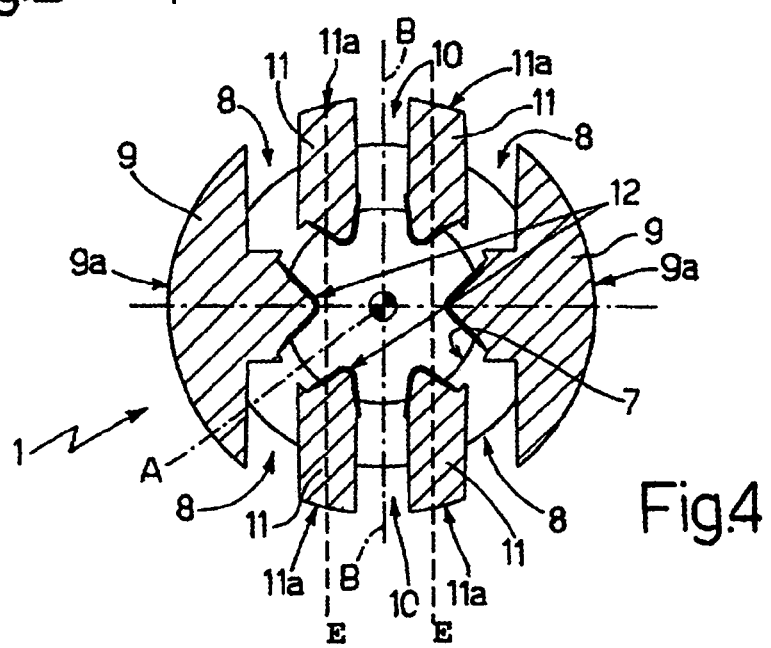

SCREW ANCHOR

The present invention relates to a screw anchor, in particular a screw anchor suitable for use in the construction, to which the following description refers purely by way of example.

BACKGROUND OF THE INVENTION

As is known, most known screw anchors comprise a deformable tubular member made of plastic or metal, and which is inserted inside a hole in a wall, body or anchoring member, with its longitudinal axis coaxial with the hole axis.

The tubular member of screw anchors of the above type is normally divided into three different portions a deformable central portion, a head connected to a first end of the central portion, and a cylindrical collar connected to the second end of the central portion and having a supporting flange.

More specifically, the central portion has four longitudinal through slots spaced angularly apart and defining, on the central portion, four longitudinal anchoring tongues, each of which is deformed radially, with respect to its rest position, by a screw screwed tightly inside the screw anchor.

Unfortunately, the deformability of the central portion of screw anchors of the above type is poor when the screw anchor is inserted inside a hole with an irregular cross section, as frequently happens when the hole is formed in a body or wall made of relatively friable or non-homogeneous material, such as a wall of plasterboard or similar material of poor internal consistency.

In such cases, the central portion of the anchor deforms, and therefore adapts, poorly, making it particularly difficult to insert, correctly position, and fasten the screw anchor inside the hole, with all the drawbacks this entails.

SUMMARY OF THE INVENTION

Is it is an object of the present invention to provide a screw anchor designed to eliminate the aforementioned drawbacks.

According to the present invention, there is provided a screw anchor having a deformable central portion in which four main longitudinal slots are formed; said screw anchor being characterized by comprising a number of secondary longitudinal slots formed in said central portion.

In a preferred embodiment of the screw anchor defined above, each said secondary longitudinal slot defines, on said central portion and with an adjacent main longitudinal slot and/or an adjacent secondary longitudinal slot, respective deformable secondary longitudinal anchoring tongues.

BRIEF DESCRIPTION OF THE DRAWINGS

A non-limiting embodiment of the present invention will be described by way of example with reference to the accompanying drawings, in which:

FIG. 2 shows a first side view of the FIG. 1 screw anchor;

FIG. 3 shows a second side view of the FIG. 2 screw anchor;

FIG. 4 shows an enlarged section of the screw anchor along line I-I in FIG. 2.

DETAILED DESCRIPTION OF THE INVENTION

Figure 1:
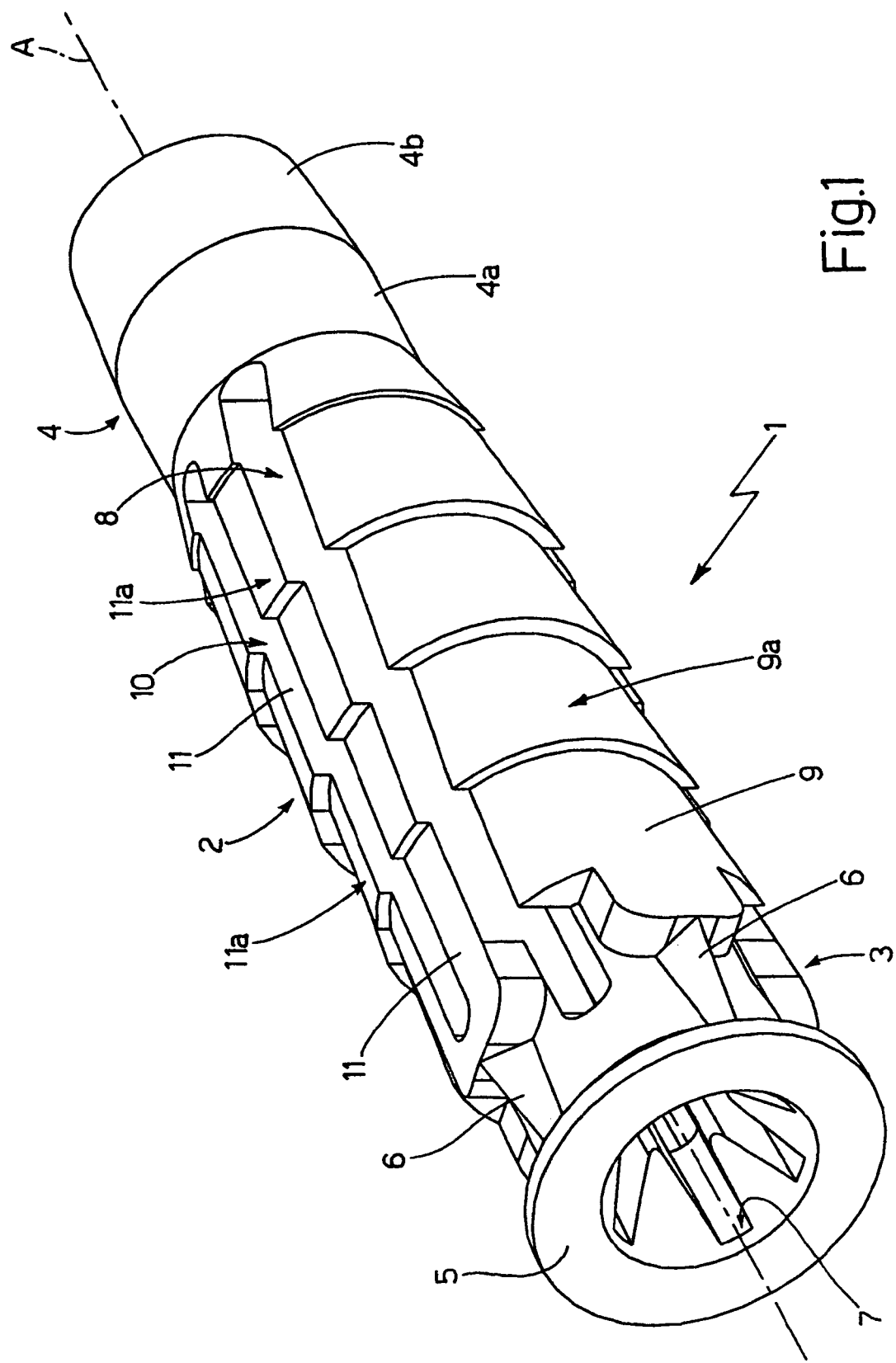
FIG. 1 shows an enlarged view in perspective of a screw anchor in accordance with the teachings of the present invention.

Number 1 in FIGS. 1, 2 and 3 indicates as a whole a screw anchor which is insertable inside a hole (not shown) formed in a wall or any anchoring body or member (not shown), with its longitudinal axis A coaxial with the axis of the hole (not shown), and is engaged by a known screw (not shown) which permanently deforms the screw anchor inside the hole (not shown).

Screw anchor 1 comprises a deformable tubular member made preferably, though not necessarily, of plastic, metal, or similar materials, and which comprises a deformable central portion 2, and a collar 3 and a head 4 connected to respective opposite ends of central portion 2.

Collar 3 is coaxial with longitudinal axis A, and has, at one end, an annular flange 5, and a number of projecting longitudinal appendixes 6 for preventing screw anchor 1 from rotating about longitudinal axis A when screw anchor 1 is inserted fully inside the hole (not hole) and the screw is inserted inside the screw anchor.

More specifically, in the example shown, projecting longitudinal appendixes 6 extend, parallel to longitudinal axis A, between annular flange 5 and the end of central portion 2, project radially from the surface of collar 3, and are equally spaced angularly.

With particular reference to FIGS. 1, 2 and 3, head 4 comprises a cylindrical portion 4a connected to the opposite end of central portion 2 to collar 3; and a substantially truncated-cone-shaped end portion 4b.

Central portion 2 of screw anchor 1 has an outside diameter which is preferably, though not necessarily, approximately equal to but no smaller than the inside diameter of the hole formed in the wall and into which screw anchor 1 is inserted.

Central portion 2 of screw anchor 1 also comprises four main longitudinal slots 8, which are formed in the wall of the central portion, extend parallel to axis A along the whole length of central portion 2, and are spaced angularly apart.

More specifically, and as shown more clearly in FIG. 4, the four main longitudinal slots 8 are through slots, which are formed through the wall of central portion 2, are equally spaced one either side of and essentially parallel to a centreline plane B on which the longitudinal axis A lies, and define two deformable main longitudinal anchoring tongues 9.

As also shown in FIGS. 3 and 4, the two main longitudinal tongues 9 are diametrically opposite, i.e. are located on opposite sides of the centreline plane B through and each have a main anchoring face or surface 9a having a preferably, though not necessarily, serrated profile for easy insertion of screw anchor 1 inside the hole (not shown), and for preventing withdrawal of the screw anchor from the hole.

Unlike known screw anchors, screw anchor 1 also comprises, in addition to the four main longitudinal slots 8, two secondary through longitudinal slots 10 formed in the body of central portion 2 and extending, parallel to axis A, along the whole length of central portion 2.

Each secondary longitudinal slot 10 is formed in central portion 2 to define, with the two adjacent main longitudinal slots 8, two deformable secondary longitudinal anchoring tongues 11.

More specifically, in the example shown, the two secondary longitudinal slots 10 extend along the centreline plane B of the anchor, along the whole length of central portion 2, and are diametrically opposite, so that each secondary longitudinal slot 10 is equidistant from the two adjacent main longitudinal slots 8.

With particular reference to FIG. 4, in the example shown, the four secondary longitudinal tongues 11 lie, in pairs, in respective planes E parallel to but not coincident with plane B, and each have an outer face or surface 11a with a preferably, though not necessarily, serrated profile.

Obviously, main longitudinal slots 8 and secondary longitudinal slots 10 may also extend in planes through axis A, so that the resulting secondary longitudinal tongues 11 are positioned radially.

The secondary longitudinal slots 10 formed in central portion 2 may obviously also be more than two in number, so as to define a greater number of deformable secondary longitudinal anchoring tongues 11. In which case, each secondary longitudinal tongue 11 may be defined by a pair of adjacent secondary longitudinal slots 10, or by a secondary longitudinal slot 10 and an adjacent main longitudinal slot 8.

With reference to FIGS. 1 and 4, screw anchor 1 comprises a through hole 7 extending coaxially with longitudinal axis A and for receiving the shank of the screw (not shown) which, in use, deforms central portion 2 radially outwards to fix screw anchor 1 to the wall.

More specifically, in the FIG. 4 example, through hole 7 of screw anchor 1 is shaped to comprise, internally, a number of projecting longitudinal ribs 12 extending, parallel to longitudinal axis A, along the whole length of screw anchor 1.

Longitudinal ribs 12 are spaced angularly apart, so that through hole 7 has a substantially star-shaped cross section.

In the FIG. 4 example, there are six longitudinal ribs 12, though their number may obviously vary.

Operation of screw anchor 1 is easily deducible from the foregoing description with no further explanation required.

The advantages of screw anchor 1 are as follows: secondary longitudinal tongues 10 greatly increase the deformability of screw anchor 1, while at the same time maintaining a strong central portion 2 which can therefore adapt to holes of irregular cross section or formed in walls of perforated material or material of poor consistency.

With the above geometry, screw anchor 1 can be inserted easily inside the hole in the wall, regardless of the material the wall is made of, and at the same time is anchored firmly to the wall. The above geometry, in fact, permits uniform radial extension of screw anchor 1, thus improving force distribution in the wall when anchoring the anchor.

Finally, mechanical laboratory tests have shown that screw anchor 1 as described enables the user to judge more accurately the tightening torque produced when screwing the screw inside the through hole in screw anchor 1 and head 4.

Clearly, changes may be made to the screw anchor as described and illustrated herein without, however, departing from the scope of the present invention.

The invention claimed is:

1. A screw anchor comprising:
    a deformable central portion in which main longitudinal slots are formed, the main longitudinal slots each being formed in a plane, extending essentially parallel to a plane on which a longitudinal axis of the screw anchor lies, and defining deformable main longitudinal anchoring tongues which lie on opposite sides of the plane and which have a substantially serrated profile;
    secondary longitudinal through slots formed in the same central portion, the secondary slots each being formed in a plane, essentially parallel with the planes of the main longitudinal slots and having a length which is different from the length of the main longitudinal slots, and wherein said secondary longitudinal slots, define, with an adjacent main longitudinal slot, deformable secondary longitudinal anchoring tongues, the main longitudinal slots and the secondary longitudinal slots being non-equidistantly arranged about the periphery of the screw anchor.

2. A screw anchor as claimed in claim 1, wherein each deformable secondary longitudinal anchoring tongue has a substantially serrated profile.

3. A screw anchor as claimed in claim 1, wherein said main longitudinal slots are spaced apart on said central portion (2).

4. A screw anchor as claimed in claim 1, wherein said main longitudinal slots comprise four slots which are arranged in two pairs, and wherein each pair of main longitudinal slots are parallel to each other and wherein the pairs of main longitudinal slots are arranged in a mirror image relationship with each other.

5. A screw anchor as claimed in claim 4, wherein each secondary longitudinal slot is located between each pair of main longitudinal slots.

6. A screw anchor as claimed in claim 1, further comprising a collar at a first end of said central portion; said collar having an annular flange coaxial with said longitudinal axis.

7. A screw anchor as claimed in claim 6, further comprising a number of equally spaced projecting appendixes integral with said collar and extending parallel to said longitudinal axis.

8. A screw anchor as claimed in claim 6, further comprising a head at a second end of said central portion.

9. A screw anchor as claimed in claim 1, wherein each secondary longitudinal slot has a length which is shorter than a length of the main longitudinal slots.

10. A screw anchor as claimed in claim 1, further comprising: an angularly-shaped longitudinal rib on each of the main longitudinal anchoring tongues and on each of the secondary longitudinal anchoring tongues.

11. A screw anchor comprising:
    main longitudinal slots each formed in a plane and defining serrated main longitudinal tongues wherein each tongue is located on an opposites side of a plane on which a longitudinal axis of the screw anchor lies; and
    secondary through longitudinal slots each formed in a plane and which are formed in the same region as the main longitudinal slots and essentially parallel with the planes of the main longitudinal slots defining pairs of secondary anchoring tongues wherein the pairs are configured so that the one pair of secondary anchoring tongues is located on one side of the plane, and a second pair of secondary anchoring tongues is located on a second side of the plane, the main longitudinal slots and the secondary slots being non-uniformly spaced about a periphery of the screw anchor.

* * * * *